US012712967B2

(12) United States Patent
Kim

(10) Patent No.: US 12,712,967 B2
(45) Date of Patent: Aug. 18, 2026

(54) CALL ALLOCATION METHOD FOR COMMERCIAL VEHICLES AND CALL ALLOCATION SYSTEM PROVIDING THE SAME

(71) Applicants: Hyundai Motor Company, Seoul (KR); Kia Corporation, Seoul (KR)

(72) Inventor: Sojeong Kim, Seoul (KR)

(73) Assignees: Hyundai Motor Company;, Seoul (KR); Kia Corporation, Seoul (KR)

(*) Notice: Subject to any disclaimer, the term of this patent is extended or adjusted under 35 U.S.C. 154(b) by 724 days.

(21) Appl. No.: 17/901,600

(22) Filed: Sep. 1, 2022

(65) Prior Publication Data

US 2023/0095009 A1 Mar. 30, 2023

(30) Foreign Application Priority Data

Sep. 29, 2021 (KR) ........................ 10-2021-0128789

(51) Int. Cl.
*H04M 3/42* (2006.01)
*G06Q 10/02* (2012.01)
(Continued)

(52) U.S. Cl.
CPC ........ *H04M 3/42357* (2013.01); *G06Q 10/02* (2013.01); *H04M 3/523* (2013.01); *G06Q 50/40* (2024.01)

(58) Field of Classification Search
CPC .. H04M 3/42357; H04M 3/523; G06Q 10/02; G06Q 50/40; G06Q 10/0631; G06Q 10/06315; G06Q 30/0278; G08G 1/202
See application file for complete search history.

(56) References Cited

U.S. PATENT DOCUMENTS 5,533,107 A * 7/1996 Irwin ........................ H04Q 3/66 379/127.01
2004/0106399 A1* 6/2004 Ki .......................... G08G 1/202 455/445

(Continued)

FOREIGN PATENT DOCUMENTS

DE 102015208291 A1 * 11/2015 ............. G06Q 50/10
JP 3864205 B2 12/2006

(Continued)

*Primary Examiner* — Yuwen Pan
*Assistant Examiner* — Samuel H. Leonard
(74) *Attorney, Agent, or Firm* — MORGAN, LEWIS & BOCKIUS LLP

(57) ABSTRACT

A call allocation system includes a server which extracts first concentration areas matched with an operating time of the commercial vehicle among a concentration areas, extracts a second concentration area corresponding to a grade of the commercial vehicle among first concentration areas, and transmits a first message requesting movement thereof to the second concentration area to vehicle terminal of commercial vehicle, wherein the server allocates the call of the customer terminal, in which a departure or a destination is located in the second concentration area, to the commercial vehicle when the commercial vehicle enters the second concentration area, the concentration area is an area in which an average value of a number of calls per unit time corresponding to the operating time is a first reference value or more than the first reference value among areas divided according to a predetermined reference, and the grade is a score of evaluating satisfaction of the commercial vehicle.

9 Claims, 11 Drawing Sheets

(51) Int. Cl.

*G06Q 50/40* (2024.01)
*H04M 3/523* (2006.01)

(56) References Cited

U.S. PATENT DOCUMENTS

| | | | | |
|---|---|---|---|---|
| 2006/0034445 | A1* | 2/2006 | Shelton | H04M 3/523 379/266.01 |
| 2007/0030175 | A1* | 2/2007 | Horstemeyer | H04M 3/487 340/994 |
| 2011/0004496 | A1* | 1/2011 | Erb | G06Q 10/02 705/5 |
| 2016/0247247 | A1* | 8/2016 | Scicluna | G06Q 50/40 |
| 2017/0039667 | A1* | 2/2017 | Kim | G06F 16/29 |
| 2017/0046644 | A1* | 2/2017 | Zhang | G06Q 30/0635 |
| 2018/0046961 | A1* | 2/2018 | Tulabandhula | G06N 7/01 |
| 2018/0124207 | A1* | 5/2018 | Marueli | G06Q 50/40 |
| 2019/0205796 | A1* | 7/2019 | Dutta | G08G 1/20 |
| 2019/0304299 | A1* | 10/2019 | Feng | G06Q 50/40 |
| 2020/0042019 | A1* | 2/2020 | Marczuk | G08G 1/202 |
| 2020/0377128 | A1* | 12/2020 | Marczuk | G08G 1/096816 |
| 2021/0304098 | A1* | 9/2021 | Yang | G01C 21/3415 |
| 2022/0020105 | A1* | 1/2022 | Semple | G01C 21/3438 |
| 2022/0179416 | A1* | 6/2022 | Cacioppo | H04W 4/40 |
| 2024/0185714 | A1* | 6/2024 | Jha | G01C 21/34 |

FOREIGN PATENT DOCUMENTS

| | | | | |
|---|---|---|---|---|
| JP | 2009-146300 | A | 7/2009 | |
| KR | 10-2013-0046013 | A | 5/2013 | |
| KR | 10-2020-0014977 | A | 2/2020 | |
| WO | WO-2019083528 | A1 * | 5/2019 | G06Q 50/30 |
| WO | WO-2020131550 | A1 * | 6/2020 | G06Q 10/047 |

* cited by examiner

FIG. 5

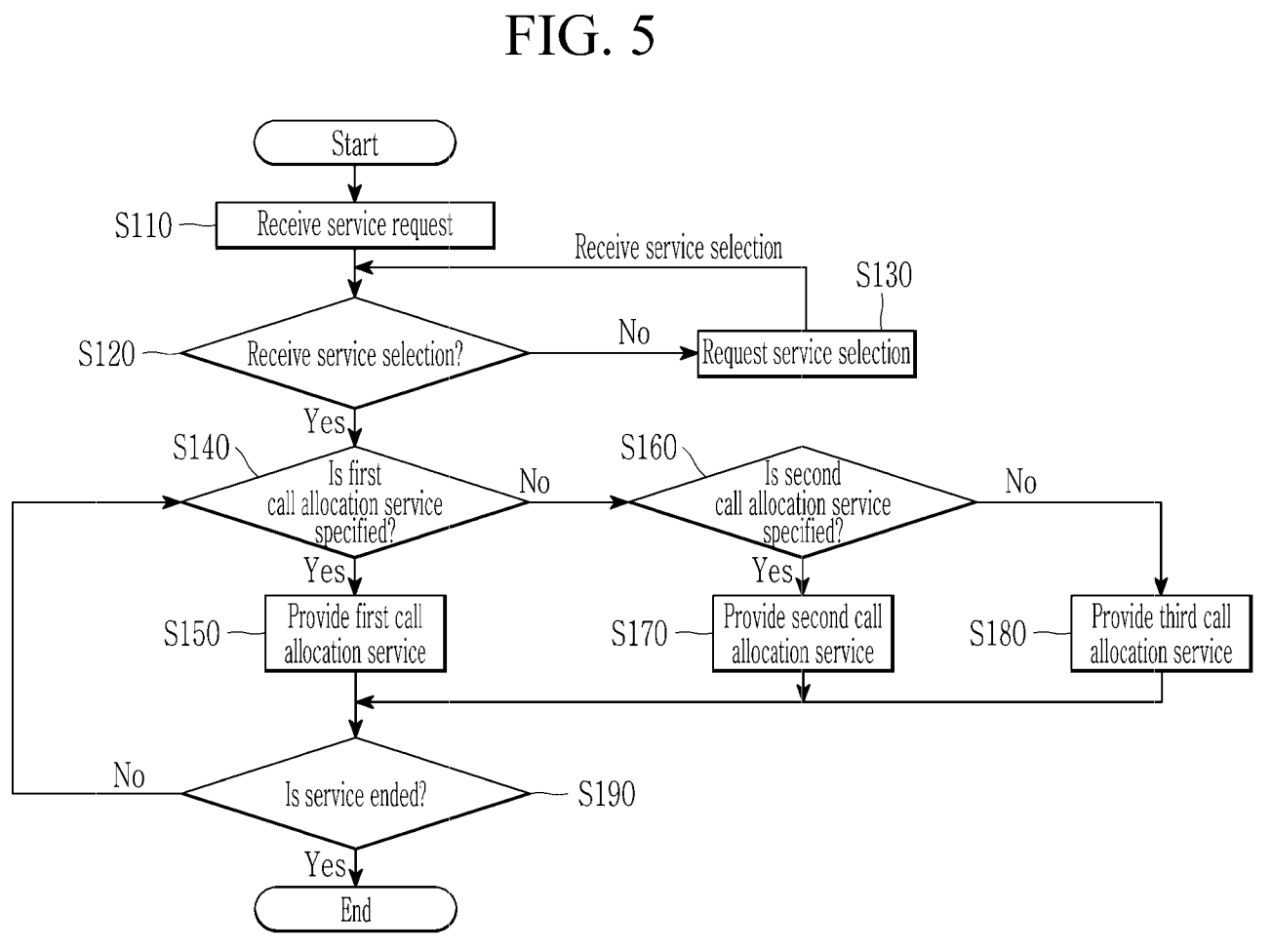

Start

S110 Receive service request

S120 Receive service selection?

No

S130 Request service selection

Receive service selection

Yes

S140 Is first call allocation service specified?

Yes

S150 Provide first call allocation service

No

S160 Is second call allocation service specified?

Yes

S170 Provide second call allocation service

No

S180 Provide third call allocation service

S190 Is service ended?

No

Yes

End

CALL ALLOCATION METHOD FOR COMMERCIAL VEHICLES AND CALL ALLOCATION SYSTEM PROVIDING THE SAME

CROSS-REFERENCE TO RELATED APPLICATION

The present application claims priority to Korean Patent Application No. 10-2021-0128789 filed on Sep. 29, 2021, the entire contents of which is incorporated herein for all purposes by this reference.

BACKGROUND OF THE PRESENT DISCLOSURE

Field of the Present Disclosure

The present disclosure relates to a call allocation method for commercial vehicles such as taxi and a call allocation system providing the same.

Description of Related Art

Recently, as IT technology such as mobile communication is developed, a call center service taking reservations for boarding from customers has been provided from the customer, and commercial vehicles, which are currently subscribed to the call center portion service, have been increased.

Meanwhile, calling is often concentrated in a specific area in a specific time zone. A transport service provider (e.g., taxi driver) frequently refuses passengers according to a destination of a transport service user (e.g., customer), which is pointed out as a social problem. To solve the problems, local governments and the like regulate illegal refusal of passengers, but it is not an effective solution.

Furthermore, a taxi driver often lacks information related to an area where call calling is frequent in a specific time zone, and frequently wanders in a certain area while the customer does not board. Furthermore, when a customer's destination is a distant area that the taxi driver does not want, or an area where the call calling is not frequent, the taxi driver has often returned to an empty car after the taxi driver gets off the corresponding customer and then does not further carry a customer.

Therefore, a solution is required to increase illegal refusal of passengers and performance of commercial vehicles.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a call allocation method for commercial vehicles and a call allocation system providing the method configured for operating commercial vehicles without excessive competition in an area with a large number of calls of a customer terminal. Furthermore, various aspects of the present disclosure are directed to providing a call allocation method for commercial vehicles and a call allocation system providing the method configured for operating commercial vehicles without excessive competition in an area where a customer prefers.

Furthermore, various aspects of the present disclosure are directed to providing a call allocation method for commercial vehicles and a call allocation system providing the method configured for reducing a time when the commercial vehicle is operating in no passenger and solving a refusal problem of passengers.

Various aspects of the present disclosure are directed to providing a call allocation system as a system for allocating a call of a customer terminal to a commercial vehicle, including a server which is configured to extract a plurality of first concentration areas matched with an operating time of the commercial vehicle among a plurality of concentration areas, extracts a second concentration area corresponding to a grade of the commercial vehicle among the plurality of first concentration areas, and transmits a first message requesting movement thereof to the second concentration area to the vehicle terminal of the commercial vehicle, wherein the server is configured to allocate the call of the customer terminal, in which a departure or a destination is located in the second concentration area, to the commercial vehicle when the commercial vehicle enters the second concentration area, the concentration area is an area in which an average value of a number of calls per unit time corresponding to the operating time is a first reference value or more than the first reference value among a plurality of areas divided according to a predetermined reference, and the grade is a score of evaluating satisfaction of the commercial vehicle.

Various aspects of the present disclosure are directed to providing a call allocation system as a system for allocating a call of a customer terminal to a commercial vehicle, including a server which is configured to extract a plurality of first concentration areas matched with an operating time of the commercial vehicle among a plurality of concentration areas, extracts a first preference area corresponding to a grade of the commercial vehicle among the plurality of first concentration areas, and transmits a first message requesting movement thereof to the first preference area to the vehicle terminal of the commercial vehicle, wherein the server is configured to allocate the call of the customer terminal, in which a departure or a destination is located in the first preference area, to the commercial vehicle when the commercial vehicle enters the first preference area, the concentration area is an area in which an average value of a number of calls per unit time corresponding to the operating time is a first reference value or more than the first reference value among a plurality of areas divided according to a predetermined reference, and the preference of the commercial vehicle is derived by analysis for an area where the commercial vehicle is operating or analysis for an area where a driver of the commercial vehicle prefers.

Various aspects of the present disclosure are directed to providing a call allocation method as a method for allocating a call of a customer terminal to a commercial vehicle subscribing to a call allocation service, including extracting a plurality of first concentration areas matched with an operating time of the commercial vehicle among a plurality of concentration areas, extracting a second concentration area corresponding to a grade of the commercial vehicle among the plurality of first concentration areas, and transmitting a first message requesting movement thereof to the second concentration area to the vehicle terminal of the commercial vehicle to guide the second concentration area; and providing the call allocation service by allocating the call of the customer terminal, in which a departure or a destination is located in the second concentration area, to the commercial vehicle when the commercial vehicle enters the second concentration area.

Various aspects of the present disclosure are directed to providing a call allocation method as a method for allocating a call of a customer terminal to a commercial vehicle subscribing to a call allocation service, including extracting at least one first concentration area matched with an operating time of the commercial vehicle, extracting a first preference area corresponding to preference of the commercial vehicle among the first concentration area, and transmitting a first message requesting movement thereof to the first preference area to the vehicle terminal of the commercial vehicle to guide the first preference area; and providing the call allocation service by allocating the call of the customer terminal, in which a departure or a destination is located in the first preference area, to the commercial vehicle when the commercial vehicle enters the first preference area.

According to various exemplary embodiments of the present disclosure, it is possible to operate commercial vehicles in an area with a large number of calls of a customer terminal without excessive competition by allocating commercial vehicles corresponding to a high grade to the area with a large number of calls of the customer terminal.

According to various exemplary embodiments of the present disclosure, it is possible to reduce an operating time while there is no customer in the commercial vehicle and solve a refusal problem of passengers by allocating a call in which a departure or a destination is located in a concentration area (or preference area) to a commercial vehicle subscribing to the call allocation service.

According to various exemplary embodiments of the present disclosure, it is possible to reduce side effects according to selection of a concentration area and a preference area and increase a success ratio for the matching of the customer and the commercial vehicle by inducing commercial vehicles to be distributed to an area close to an area (hereinafter, congestion area) where the commercial vehicles are excessively congested.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is a flowchart for describing a call allocation method for commercial vehicles according to an exemplary embodiment of the present disclosure.

Figure 1:
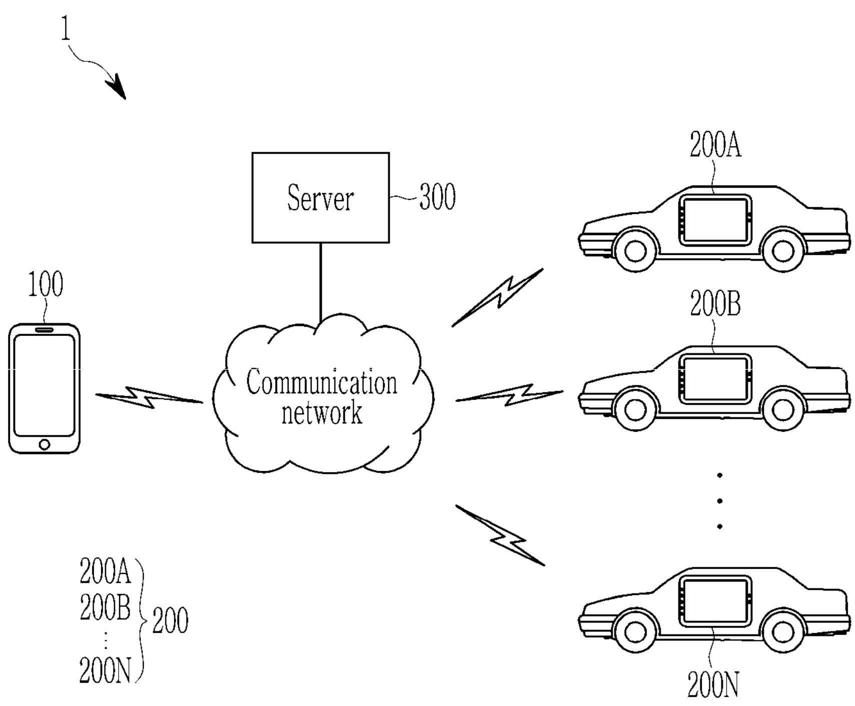
FIG. 1 is a diagram for describing a call allocation system of providing a call allocation method for commercial vehicles according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the exemplary embodiment will be described in detail with reference to the accompanying drawings and the same or similar components are denoted by the same reference numerals regardless of a sign of the drawing, and duplicated description thereof will be omitted. Suffixes “module”, “block”, and “unit” for components used in the following description are given or mixed in consideration of easy preparation of the specification only and do not have their own distinguished meanings or roles. Furthermore, in describing an exemplary embodiment disclosed in the present disclosure, a detailed description of related known technologies will be omitted if it is decided that the detailed description makes the gist of the exemplary embodiment of the present disclosure unclear. Also, it should be understood that the appended drawings are intended only to help understand embodiments disclosed in the present specification and do not limit the technical principles and scope of the present disclosure; rather, it should be understood that the appended drawings include all of the modifications, equivalents or substitutes described by the technical principles and belonging to the technical scope of the present disclosure.

Terms including an ordinary number, such as first, second, etc., may be used for describing various constituent elements, but the constituent elements are not limited by the terms. The terms are used only to discriminate one component from the other component.

It should be understood that, when it is described that a component is “coupled” or “connected” to the other component, the component may be directly coupled or connected to the other component, but there may be another component therebetween. In contrast, it should be understood that, when it is described that a component is "directly coupled" or "directly connected" to the other component, it should be understood that no component is present therebetween.

The terms "comprising," or "having," are inclusive and therefore specify the presence of stated features, integers, steps, operations, elements, and/or components, but do not preclude the presence or addition of one or more other features, integers, steps, operations, elements, components, and/or groups thereof.

Figure 2:
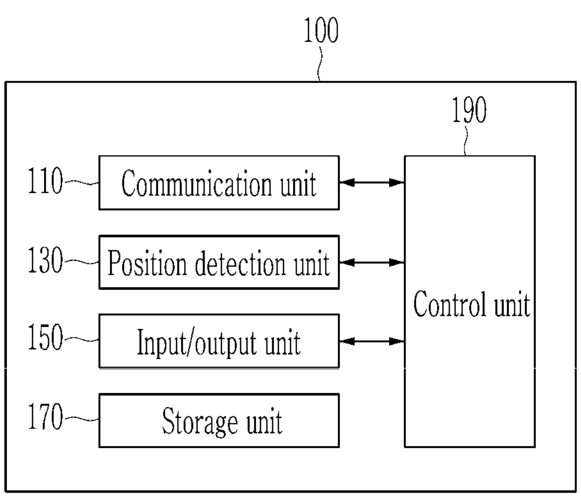
FIG. 2 is a block diagram for describing a configuration of a customer terminal of FIG. 1 in detail.
Figure 3:
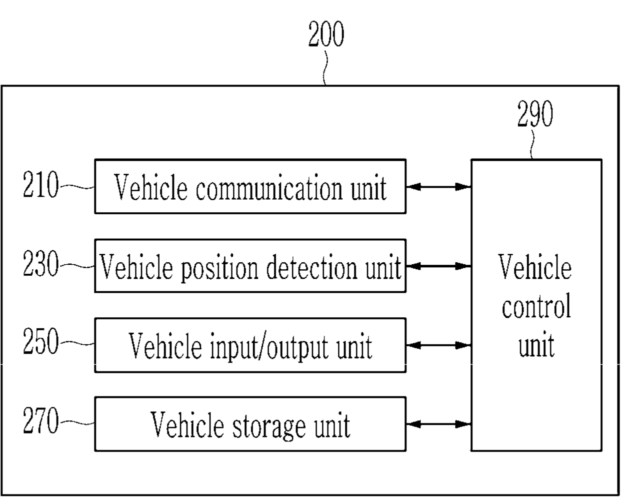
FIG. 3 is a block diagram for describing a configuration of a vehicle terminal of FIG. 1 in detail.
Figure 4:
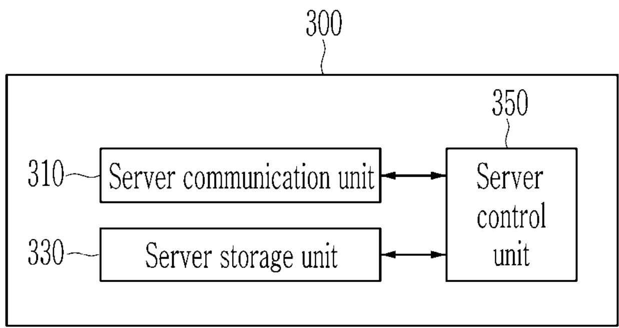
FIG. 4 is a block diagram of a configuration of a server of FIG. 1 in detail.

FIG. 1 is a diagram for describing a call allocation system of providing a call allocation method for commercial vehicles according to an exemplary embodiment of the present disclosure, FIG. 2 is a block diagram for describing a configuration of a customer terminal of FIG. 1 in detail, FIG. 3 is a block diagram for describing a configuration of a vehicle terminal of FIG. 1 in detail, and FIG. 4 is a block diagram of a configuration of a server of FIG. 1 in detail.

Referring to FIG. 1, a call allocation system 1 includes a customer terminal 100, a vehicle terminal 200, and a server 300.

The customer terminal 100 is a terminal which is held by a customer using a vehicle reservation service for the boarding of a commercial vehicle. At the instant time, the commercial vehicle may be a vehicle for providing a service of carrying a customer to a destination by receiving a fare.

In FIG. 1, the customer terminal 100 is illustrated as a smart phone, but is not limited thereto. For example, the customer terminal 100 may include a desktop PC, a tablet PC, a slate PC, a notebook computer, a digital broadcasting terminal, personal digital assistants (PDA), a portable multimedia player, a navigation, a digital camera, an MPEG layer 3 player, and the like. It is also natural that a terminal applicable to a customer terminal 100_*i* is not limited to the type described above, and may include all terminals configured for communicating with an external device. Hereinafter, a specific customer terminal 100 of a plurality of customer terminals 100 is indicated using customer numeral "100_*i*".

Referring to FIG. 2, the customer terminal 100 includes a communication unit 110, a position detection unit 130, an input/output unit 150, a storage unit 170, and a control unit 190.

The communication unit 110 may be connected to a communication network to transmit and receive data to or from the server 300. The communication unit 110 may be connected to the communication network through a wireless communication protocol such as GSM/3GPP-based communication schemes (GSM, HSDPA, and LTE Advanced), 3GPP2-based communication schemes (CDMA, etc.), or WiMAX, but is not limited thereto. For example, the communication unit 110 may also be connected to a communication network through a conventional communication protocol or a communication protocol to be developed according to the development of future technology.

The position detection unit 130 may detect a position of a customer held by the customer terminal 100. For example, the position detection unit 130 may detect the position of the customer terminal 100 based on a GPS signal transmitted from a global positioning system (GPS) satellite, but is not limited thereto. As an exemplary embodiment of the present disclosure, the position detection unit 130 may communicate with a plurality of base stations to detect the position of the customer terminal 100. Furthermore, the position detection unit 130 may also detect the position of the customer terminal 100 by use of another position detection method to be provided by the development of future technology as well as a conventional position detection method.

The input/output unit 150 may display various information necessary to provide a vehicle reservation service to the customer and receive various inputs of the customer. For example, the input/output unit 150 may include a display means, such as a plasma display panel (PDP), a liquid crystal display (LCD), a light emitting diode (LED) panel, or an organic light emitting diode (OLED) panel, an active-matrix organic light emitting diode (AMOLED) panel, for displaying the information described above. As an exemplary embodiment of the present disclosure, the input/output unit 150 may include a button input means such as a key pad, a push button, or a membrane button, and a touch input means such as a touch pad, for receiving information from the customer, and may also be implemented in a touch screen form configured for inputting and outputting.

The storage unit 170 may store data, algorithms, and the like required for operating the customer terminal 100. According to an exemplary embodiment of the present disclosure, the storage unit 170 may store applications (hereinafter, apps) related with a vehicle reservation service, information received from the customer through the input/output unit 150, a position of the customer terminal 100 detected by the position detection unit 130, etc., but is not limited thereto. Furthermore, the storage unit 170 may store various data which are transmitted and received to/from the server 300 by the control unit 190 through the communication unit 110. For example, the storage unit 170 may include storage media such as a random access memory (RAM), a static random access memory (SRAM), a read-only memory (ROM), a programmable read-only memory (PROM), and an electrically erasable programmable read-only memory (EEPROM).

The control unit 190 may control the customer terminal 100 overall to provide the vehicle reservation service to the customer. For example, the control unit 190 receives recommendation information related to a plurality of commercial vehicles transmitted by the server 300 through the communication unit 110 and displays the recommendation information related to the plurality of commercial vehicles to the customer through the input/output unit 150. Furthermore, the control unit 190 may receive information on a commercial vehicle selected by the customer through the input/output unit 150, and may transmit the information on the commercial vehicle selected by the customer to the server 300 through the communication unit 110.

The vehicle terminal 200 is a terminal mounted on the commercial vehicle used for the call allocation service. For example, the vehicle terminal 200 may be mounted with an Audio, Video, and Navigation (AVN), an in-vehicle infotainment (IVI) system, and the like. At the instant time, the in-vehicle infotainment (IVI) is a word made by combining information and entertainment, which is a mobility service that provides enjoy things simultaneously with the information delivery.

Referring to FIG. 3, the vehicle terminal 200 includes a vehicle communication unit 210, a vehicle position detection unit 230, a vehicle input/output unit 250, a vehicle storage unit 270, and a vehicle control unit 290.

The vehicle communication unit 210 may be connected to the communication network to transmit and receive data to or from the server 300. The vehicle communication unit 210 may be connected to a communication network via various wireless communication protocols to transmit and receive data to or from the server 300. For example, the vehicle communication unit 210 may also be connected to a communication network through a conventional communication protocol or a communication protocol to be developed according to the development of future technology.

The vehicle position detection unit 230 may detect the position of the commercial vehicle provided with the vehicle terminal 200. For example, the vehicle position detection unit 230 may detect the position based on a GPS signal transmitted from a global positioning system (GPS) satellite, but is not limited thereto. As an exemplary embodiment of the present disclosure, the vehicle position detection unit 230 may communicate with a plurality of base stations to detect the position of the commercial vehicle. Furthermore, the vehicle position detection unit 230 may also detect the position of the commercial vehicle by use of another position detection method to be provided by the development of future technology as well as a conventional position detection method.

The vehicle input/output unit 250 may receive the request of a call allocation service, the selection of a call allocation service type, and the like from the driver. Furthermore, the vehicle input/output unit 250 may display a request message transmitted by the server 300, and may receive an acceptance message or rejection message from the driver. According to an exemplary embodiment of the present disclosure, the vehicle input/output unit 250 may display a path to a second concentration area or a first preference area on a pre-stored map. At the instant time, the path to the second concentration area or the first preference area may be transmitted from the server 300. At the instant time, the description of the request message, the second concentration area, and the first preference area will be described in detail with reference to Table 1 below.

The vehicle input/output unit 250 may include, for example, a display means such as a plasma display panel (PDP) and the like, for displaying the information described above. As an exemplary embodiment of the present disclosure, the vehicle input/output unit 250 may include a touch input means such as a key pad and the like, for receiving the acceptance message or rejection message from the driver. Furthermore, the vehicle input/output unit 250 may also be implemented in a touch screen form configured for inputting and outputting.

The vehicle storage unit 270 may store data, algorithms, and the like required for operating the vehicle terminal 200. According to an exemplary embodiment of the present disclosure, the vehicle storage unit 270 may store a navigation program and the like displaying an application (hereinafter, app) related with a call allocation service, various information received from the driver through the vehicle input/output unit 250, a position of the commercial vehicle detected by the vehicle position detection unit 230, and a path to a destination, but is not limited thereto. As an exemplary embodiment of the present disclosure, the vehicle storage unit 270 may store various data which are transmitted and received to/from the server 300 by the vehicle control unit 290 through the vehicle communication unit 210. In addition, the vehicle storage unit 270 may include storage media such as a random access memory (RAM), a static random access memory (SRAM), and the like.

The vehicle control unit 290 may control the vehicle terminal 200 overall to provide the call allocation service to the driver. For example, the vehicle control unit 290 may transmit a request message of the call allocation service, real-time position information of the commercial vehicle, and the like to the server 300 through the vehicle communication unit 210.

The server 300 may provide a service that allocates a call of the customer terminal 100 to the commercial vehicle. At the instant time, the commercial vehicle may receive a first call allocation service, a second call allocation service, or a third call allocation service.

Referring to FIG. 4, the server 300 includes a server communication unit 310, a server storage unit 330, and a server control unit 350.

The server communication unit 310 may transmit and receive data to or from each of the customer terminal 100 and the vehicle terminal 200, using a wireless communication protocol configured for communicating with each of the customer terminal 100 and the vehicle terminal 200.

The server storage unit 330 may store various information for providing the call allocation service to the commercial vehicle. For example, the server storage unit 330 has an average value of the number of calls for each of a plurality of areas, an average value of the number of calls generated throughout the plurality of areas, the number of commercial vehicles collected in real time in each of the plurality of areas, and the like. At this time, the average value of the number of calls generated throughout the plurality of areas may correspond to a first average value to be described below.

The server control unit 350 determines which commercial vehicle a call from the customer terminal 100 is allocated based on the information obtained from the vehicle terminal 200 of each of the plurality of commercial vehicles. The server control unit 350 may transmit the determined allocation information to a vehicle terminal 200_*i* of the corresponding commercial vehicle. Furthermore, the vehicle terminal 200 of a specific commercial vehicle of a plurality of commercial vehicles is indicated using reference numeral "200_*i*".

The server control unit 350 may extract an area with a large number of calls in a plurality of areas divided according to a predetermined reference as a concentration area. Furthermore, the server control unit 350 may allocate a call of the customer terminal 100_*i* in which a departure or a destination is positioned in a concentration area to a commercial vehicle selecting a first call allocation service or a second call allocation service.

According to an exemplary embodiment of the present disclosure, depending on the first call allocation service, the server control unit 350 may transmit information related to a concentration area with a large number of calls to a vehicle terminal 200_*i* of a commercial vehicle having a high grade. Furthermore, the server control unit 350 may transmit information on a concentration area with a small number of calls to a vehicle terminal 200_*i* of a commercial vehicle having a low grade. Accordingly, it is possible to prevent commercial vehicles from being excessively concentrated in a predetermined concentration area. Furthermore, it is possible to expect the quality improvement of an operating service provided to the customer by the commercial vehicle by inducing the commercial vehicle to receive a good grade.

According to another exemplary embodiment of the present disclosure, depending on the second call allocation service, the control unit 350 may transmit information on a preference area with both a large number of calls and a high preference of the commercial vehicle to the vehicle terminal 200_*i*. Accordingly, it may be expected to improve the profit of the commercial vehicle while reflecting the preference of each commercial vehicle.

According to various exemplary embodiments of the present disclosure, when a congestion area occurs, the server control unit 350 may transmit information on a concentration area positioned close to the congestion area to the vehicle terminal 200_*i* of the commercial vehicle having the low grade. Accordingly, it is possible to solve that the commercial vehicles are excessively concentrated in a predetermined concentration area. The congestion area is area where the number of commercial vehicles during operating exceeds the number of calls. The more detailed description will be described below with reference to FIGS. 5 to 11.

Figure 6:
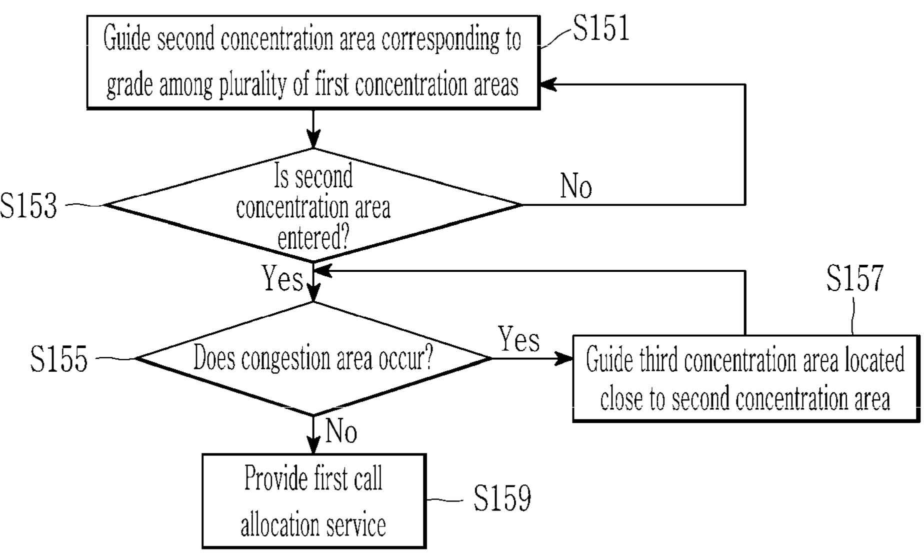
FIG. 6 is a flowchart for describing a first call allocation service providing step (step S150) of FIG. 5 in detail.
Figure 7:
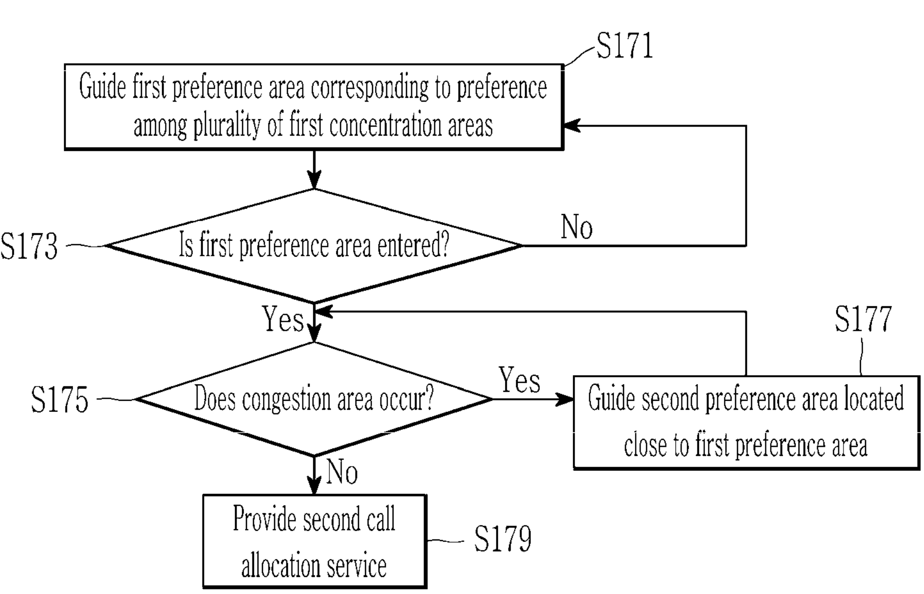
FIG. 7 is a flowchart for describing a second call allocation service providing step (step S170) of FIG. 5 in detail.
Figure 8:
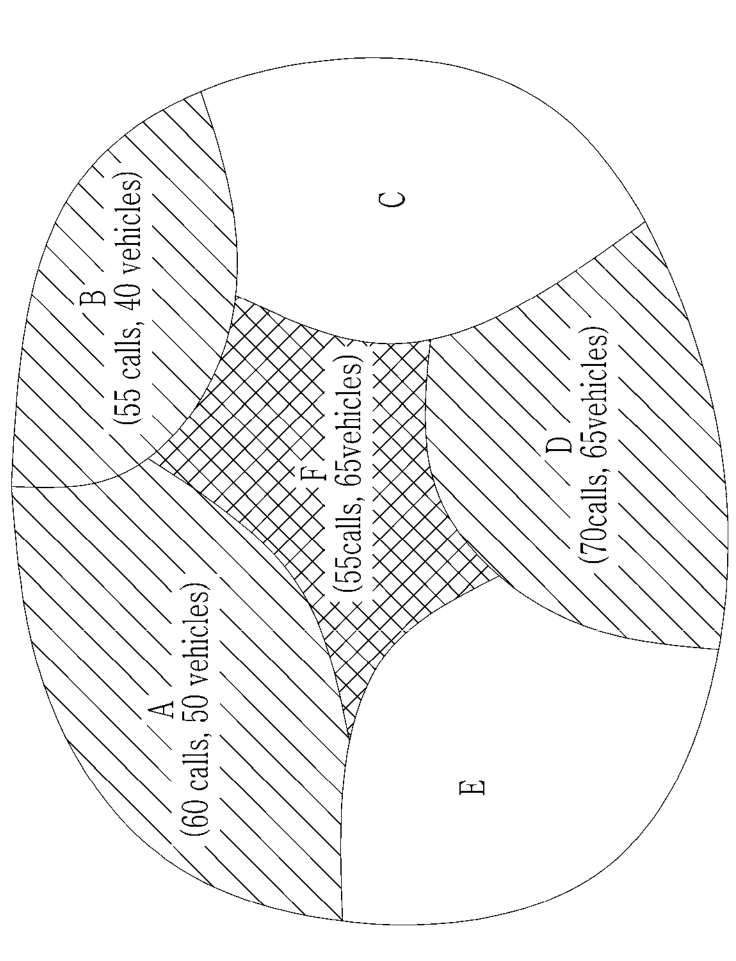
FIG. 8 is an exemplary diagram for describing a concentration area, a preference area, and a congestion area.
Figure 9:
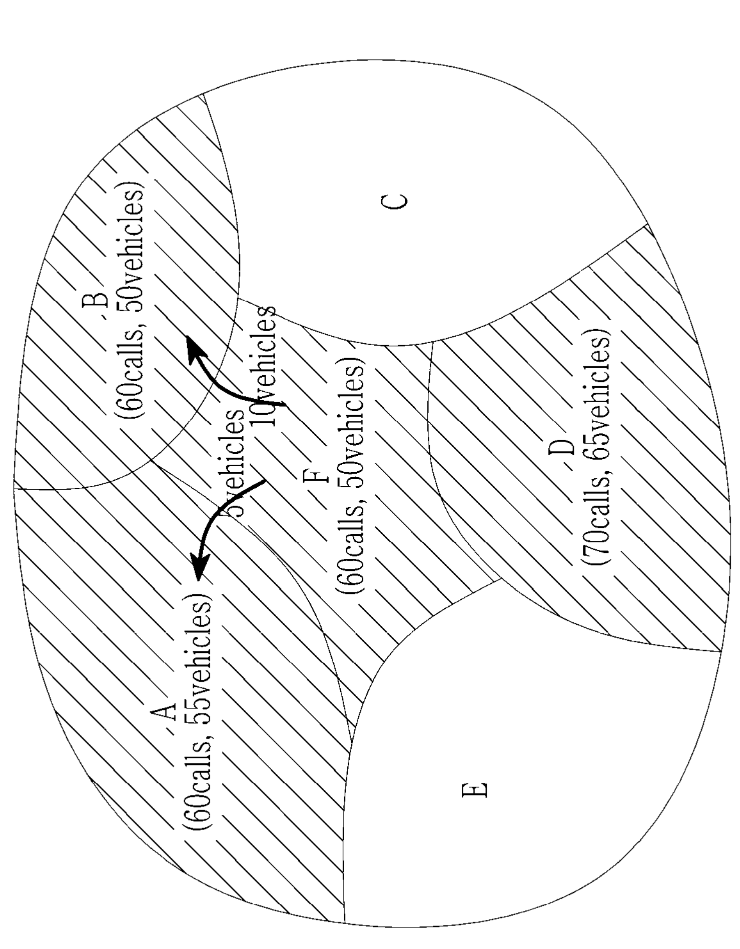
FIG. 9 is an exemplary diagram for describing a method for solving the congestion area illustrated in FIG. 8.

FIG. 5 is a flowchart for describing a call allocation method for commercial vehicles according to an exemplary embodiment of the present disclosure. FIG. 6 is a flowchart for describing a first call allocation service providing step (step S150) of FIG. 5 in detail. FIG. 7 is a flowchart for describing a second call allocation service providing step (step S170) of FIG. 5 in detail. FIG. 8 is an exemplary diagram for describing a concentration area, a preference area, and a congestion area. FIG. 9 is an exemplary diagram for describing a method for solving the congestion area illustrated in FIG. 8.

Hereinafter, the call allocation method for commercial vehicles and the call allocation system providing the method thereof will be described in detail with reference to FIG. 1, FIG. 2, FIG. 3, FIG. 4, FIG. 5, FIG. 6, FIG. 7, FIG. 8 and FIG. 9.

Referring to FIG. 5, first, the server 300 receives a request for the call allocation service from the commercial vehicle (S110).

For example, when the server 300 receives a message indicating the request for the call allocation service from the vehicle terminal 200_*i* of the commercial vehicle, the server 300 may determine that there is the request for the call allocation service from the commercial vehicle. However, it is not limited thereto, and the server 300 may determine whether there is the request for the call allocation service from the commercial vehicle by various methods such as execution of an application (hereinafter, app) providing the call allocation service from the vehicle terminal 200_*i* of the commercial vehicle, log-in of the driver to the call allocation service through the app executed in the vehicle terminal 200_*i* of the commercial vehicle, and the like. Hereinafter, the vehicle terminal 200_*i* of the commercial vehicle is referred to as the vehicle terminal 200_*i*.

Next, the server 300 determines whether the call allocation service for the commercial vehicle is specified (S120).

For example, when the driver selects a type of call allocation service when subscribing to the call allocation service, it may be determined that the call allocation service for the commercial vehicle is specified. According to an exemplary embodiment of the present disclosure, the call allocation service may be a first call allocation service, a second call allocation service, or a third call allocation service.

The first call allocation service is a service in which the server 300 allocates a call of the customer terminal 100_*i* to a commercial vehicle subscribing to a first call allocation service when a departure or destination of the call of the customer terminal 100_*i* is included in a concentration area corresponding to the grade of the commercial vehicle. The second call allocation service is a service in which the server 300 allocates the call of the customer terminal 100_*i* to a commercial vehicle subscribing to the second call allocation service when the departure or destination of the call of the customer terminal 100_*i* is included in a preference area corresponding to the preference of the commercial vehicle. The third call allocation service may be a service of allocating a call to a commercial vehicle positioned close to the departure of the call of the customer terminal 100_*i* without being based on the concentration area or preference area.

Next, as a result of the determining, when the call allocation service is not specified (S120, No), the server 300 may request the selection of the service type to the commercial vehicle (S130).

For example, the server 300 may transmit a message of requesting the service selection to the vehicle terminal 200_*i*. Thereafter, when the driver selects the first call allocation service, the second call allocation service, or the third call allocation service through the vehicle terminal 200_*i*, the vehicle terminal 200_*i* may transmit information on the call allocation service selected by the driver to the server 300. Accordingly, the server 300 may determine that the first call allocation service, the second call allocation service, or the third call allocation service selected by the driver is specified.

Next, as a result of the determining, when the call allocation service is specified (S120, Yes), the server 300 determines whether the specified call allocation service is the first call allocation service (S140).

Next, as a result of the determining, when the specified call allocation service is the first call allocation service (S140, Yes), the server 300 provides the first call allocation service to the commercial vehicle (S150).

Referring to FIG. 6, in step S150, the server 300 extracts a plurality of first concentration areas matched with an operating time of the commercial vehicle among the plurality of concentration areas, extracts a second concentration area corresponding to the grade of the commercial vehicle among the plurality of first concentration areas, and guides the second concentration area by transmitting a first message requesting the movement to the extracted second concentration area to the vehicle terminal 200_*i* (S151).

The first message may include position information of the second concentration area, information related to a movement path to the second concentration area at a current position of the commercial vehicle, and at least one information of an average value of the number of calls of the customer terminal 100 for the second concentration area.

The grade may be a score in which the customer evaluates the satisfaction of the commercial vehicle. According to an exemplary embodiment of the present disclosure, the grade may be an average value of scores in which a plurality of customers evaluates the satisfaction of the commercial vehicle. For example, with respect to the commercial vehicle that has boarded, the customer may input a score for each of a plurality of evaluation items through the customer terminal 100_*i*. The customer terminal 100_*i* may determine a total score by adding a score input by the customer to each of the plurality of evaluation items and transmit the determined total score to the server 300. Furthermore, the server 300 may determine a grade for each commercial vehicle by averaging the total score transmitted by each of the plurality of customers through the customer terminal 100_*i*. At the instant time, the plurality of evaluation items may include items such as the kindness, safe and comfort driving, unnecessary path deviation, and the like of the driver, but is not limited thereto and may include various types of items.

The operating time may be a time while the commercial vehicle is operating. For example, the server 300 may check a time when the commercial vehicle requests the call allocation service and extract at least one first concentration area matched with the corresponding time. Thereafter, when the operating time elapses, the server 300 may extract at least one first concentration area matched with a changed operating time again. At the instant time, the first concentration area will be described below in detail together with Table 1.

The concentration area may be an area in which an average value of the number of calls is a first reference value or more than the first reference value for a predetermined time with respect to a predetermined time period among a plurality of areas divided according to a predetermined reference. According to an exemplary embodiment of the present disclosure, the concentration area may be an area in which an average value (hereinafter, referred to as a call average value) of the number of calls per unit time corresponding to an operating time of a commercial vehicle among the plurality of areas divided according to the predetermined reference is the first reference value or more. For example, the concentration area may be an area in which a call average value for 1 hour from 1 pm to 2 pm for the last 3 months is the first reference value or more. As an exemplary embodiment of the present disclosure, the concentration area may be an area in which a call average value for 2 hours from 1 pm to 3 pm for the last 2 months is the first reference value or more. At the instant time, the first reference value may be a call average value occurring in a plurality of areas per unit time for the predetermined period. That is, the concentration area may be an area in which the call occurrence number is averagely more than that of another area for a predetermined time.

A first concentration area may be a concentration area matched with the operating time of the commercial vehicle. For example, when the operating time of the commercial vehicle is 1:10 pm, the concentration area from 1 pm to 2 pm may be the first concentration area for the commercial vehicle. According to an exemplary embodiment of the present disclosure, the concentration area may be specified as a predetermined time interval (e.g., an interval of 1 hour) based on the comparing result of the call average value and the first reference value. That is, the concentration area matched with the operating time of the commercial vehicle among the plurality of concentration areas specified every unit time may be the first concentration area. Accordingly, the first concentration area may be changed according to the operating time of the commercial vehicle. The more detailed description will be described in Table 1 below.

A second concentration area may be a first concentration area corresponding to the grade of the commercial vehicle. Accordingly, when the first concentration area is changed by changing the operating time of the commercial vehicle, the second concentration area extracted based on the first concentration area may be changed.

According to an exemplary embodiment of the present disclosure, the server 300 may extract a first concentration area having a large call average value among the plurality of first concentration areas as a second concentration area for a commercial vehicle having a high grade. In addition, the server 300 may extract a first concentration area having a small call average value among the plurality of first concentration areas as a second concentration area for a commercial vehicle having a low grade. That is, the server 300 may prevent the commercial vehicles from being excessively concentrated in a predetermined second concentration area and allocate an area having a large number of call occurrence to a commercial vehicle having a high grade to improve the operating service of the commercial vehicle.

Table 1 below is an example for concentration areas and first concentration areas. The first concentration area is classified at intervals of 1 hour, but is not limited thereto, and may be classified at various time intervals such as intervals of 2 hours or intervals of 3 hours. In Table 1 below, it is assumed that a plurality of areas includes a first area A, a second area B, a third area C, a fourth area D, a fifth area E, and a sixth area F.

TABLE 1

| Time | Concentration area |
|---|---|
| 1 pm-2 pm | First area (A), Second area (B), Fourth area (D), Sixth area (F) |
| 2 pm-3 pm | Fourth area (D), Sixth area (F) |
| 3 pm-4 pm | Second area (B), Fourth area (D), Sixth area (F) |
| 4 pm-5 pm | First area (A), Second area (B), Fourth area (D), Sixth area (F) |
| 5 pm-6 pm | First area (A), Second area (B), Fourth area (D) |
| 6 pm-7 pm | First area (A), Second area (B) |
| . . . | . . . |

Referring to Table 1, the concentration areas may be a first area A, a second area B, a fourth area D, and a sixth area F. For example, when it is assumed that a first reference value is 50 calls, a call average value of each of the first area A, the second area B, the fourth area D, and the sixth area F may be 50 calls or more.

Referring to Table 1, a first concentration areas matched with the commercial vehicle operating from 1 pm to 2 pm among the plurality of concentration areas are a first area A, a second area B, a fourth area D, and a sixth area F. Furthermore, the first concentration areas matched with the commercial vehicle operating from 2 pm to 3 pm are a fourth area D and a sixth area F. Furthermore, the first concentration areas matched with the commercial vehicle operating from 3 pm to 4 pm are a second area B, a fourth area D, and a sixth area F. In subsequent times, the first concentration area may be classified according to the operating time of the commercial vehicle.

Referring to Table 1, for example, when the operating time of the commercial vehicle is assumed as 1:10 pm, the first concentration areas matched with the operating time (1:10 pm) of the commercial vehicle are a first area A, a second area B, a fourth area D, and a sixth area F. Accordingly, the server 300 may extract a second concentration area corresponding to a grade of the commercial vehicle among a first area A, a second area B, a fourth area D, and a sixth area F.

Hereinafter, two exemplary embodiments of extracting the second concentration area will be described in detail with reference to Table 1 above, and Tables 2 and 3 below.

TABLE 2

| Call group | | Grade group | |
|---|---|---|---|
| First call group | Fourth area(D) | First grade group (10 points or less, and more than 7 points) | — |
| Second call group | First area(A) | Second grade group (7 points or less, and more than 4 points) | — |
| Third call group | Second area(B), Six area(F) | Third grade group (4 points or less, and 0 point or more) | Commercial vehicle (grade of 3 points) |

Table 2 above illustrates an example of extracting a second concentration area corresponding to a grade of the commercial vehicle among the plurality of first concentration areas matched with the operating time from 1 pm to 2 pm in Table 1 above. In Table 2, it is assumed that an average call value of the fourth area D is 60 calls, an average call value of the first area A is 58 calls, and an average call value of the second area B is 53 calls, and an average call value of the sixth area F is 53 calls. Furthermore, it is assumed that the grade of the commercial vehicle has a score range of 0 point to 10 points.

According to an exemplary embodiment of the present disclosure, referring to Table 2 above, the server 300 may classify the plurality of first concentration areas into three call groups according to a size of the average call value. A first call group may be a group having the largest average call value among the three call groups. A second call group may be a group having a medium average call value among the three call groups. A third call group may be a group having the smallest average call value among the three call groups. The server 300 may classify a fourth area D having the largest average call value to the first call group. Furthermore, the server 300 may classify a first area A having a medium average call value to the second call group. The server 300 may classify a second area B and a sixth area F having the smallest average call value to the third call group. However, it is not limited thereto, and the server 300 may classify the plurality of first concentration areas to be the same as or similar to the number of first concentration areas in each of the first call group, the second call group, and the third call group by various methods.

Referring to Table 2 above, the server 300 may divide a score range of the grade of the commercial vehicle into three score ranges according to a predetermined reference and set three grade groups corresponding to the three score ranges. The first grade group may be a group having the highest grade range among the three grade groups. The second grade group may be a group having a medium grade range among the three grade groups. The third grade group may be a group having the lowest grade range among the three grade groups. For example, the first grade group may correspond to a grade range of 10 points or less and more than 7 points. The second grade group may correspond to a grade range of 7 points or less and more than 4 points. Furthermore, the third grade group may correspond to a grade range of 4 points or less and 0 point or more. Referring to Table 2 above, commercial vehicles including a grade of 3 points may belong to the third grade group. However, it is not limited thereto, and the server 300 may set the first grade group, the second grade group, and the third grade group in various grade ranges.

In summary, the server 300 may classify a predetermined commercial vehicle into the first grade group, the second grade group, and the third grade group according to a grade. Furthermore, the server 300 may check a call group matched with the classified grade group, and extract the first concentration area belonging to the corresponding call group to a second concentration area for the predetermined commercial vehicle. Referring to Table 2 above, the server 300 may extract the second area B and the sixth area F as the second concentration area for the commercial vehicles including the grade of 3 points.

TABLE 3

| Call group | | Grade group | |
|---|---|---|---|
| Upper call group | First area (A), Fourth area (D) | Upper grade group (10 points or less and more than 5 points) | Commercial vehicle (grade of 6 points) |
| Lower call group | Second area (B), sixth area (F) | Lower grade group (5 points or less and 0 point or more) | — |

Table 3 above illustrates another example of extracting a second concentration area corresponding to a grade of the commercial vehicle among at least one or more first concentration areas matched with the operating time from 1 pm to 2 pm in Table 1 above. In Table 3, it is assumed that an average call value of the fourth area D is 60 calls, an average call value of the first area A is 58 calls, and an average call value of each of the second area B is 85 calls, and an average call value of each of the sixth area F is 53 calls. Furthermore, it is assumed that the grade of the commercial vehicle has a score range of 0 point to 10 points.

According to another exemplary embodiment of the present disclosure, referring to Table 3 above, the server 300 may classify the plurality of first concentration areas into two call groups according to a size of the average call value. The upper call group may be a group having a large average call value of the two call groups. The lower call group may be a group having a small average call value of the two call groups. The server 300 may classify a fourth area D having the largest average call value to the upper call group. Furthermore, the server 300 may classify a second area B and a sixth area F having the smallest average call value to the lower call group. At the instant time, the server 300 may classify a first area A having a medium average call value to the upper call group and set the number (two) of first concentration areas in the upper call group and the number (two) of first concentration areas in the lower call group are the same as or similar to each other. Then, it is possible to prevent the problem that the commercial vehicles are concentrated in the specific first concentration area in the upper call group or the lower call group. However, it is not limited thereto, and the server 300 may set the number of first concentration areas in the upper call group and the number of first concentration areas in the lower call group are the same as or similar to each other by various methods.

Referring to Table 3 above, the server 300 may divide a score range of the grade of the commercial vehicle into three score ranges according to a predetermined reference and set two grade groups corresponding to the two score ranges. The upper grade group may be a group having a high grade of the two grade groups. The lower grade group may be a group having a low grade of the two grade groups. For example, the upper grade group may correspond to a grade range of 10 points or less and more than 5 points. The lower grade group may correspond to a grade range of 5 points or less and 0 point or more. Referring to Table 3 above, commercial vehicles including a grade of 6 points may belong to the upper grade group. However, it is not limited thereto, and the server 300 may set the upper grade group and the lower grade group in various grade ranges.

In summary, the server 300 may classify a predetermined commercial vehicle into the upper grade group or the lower grade group according to a grade. Furthermore, the server 300 may check a call group matched with the classified grade group, and extract the first concentration area belonging to the corresponding call group to a second concentration area for the predetermined commercial vehicle. Referring to Table 3 above, the server 300 may extract the first area A and the fourth area D as the second concentration area for the commercial vehicles having the grade of 6 points.

In step S150, the server 300 determines whether the commercial vehicle enters the second concentration area (S153).

The server 300 may receive real-time position information of the commercial vehicle from the vehicle terminal 200_*i*. The server 300 compares the real-time position information of the commercial vehicle and position information of the second concentration area to determine whether the commercial vehicle enters the second concentration area in real time.

In step S150, as a result of the determining, if the commercial vehicle does not enter in the second concentration area (S153, No), the server 300 retransmits a request message of requesting the movement to the second concentration area to the vehicle terminal 200_*i* (S151).

For example, the server 300 may transmit navigation information in which the position of the vehicle terminal 200_*i*, a remaining distance to the concentration area, a moving path, and the like are indicated on a map to the vehicle terminal 200_*i*. As an exemplary embodiment of the present disclosure, the server 300 may transmit navigation information in which a remaining distance to each of the plurality of second concentration areas from the position of the vehicle terminal 200_*i*, a moving path, and the like are indicated on a map to the vehicle terminal 200_*i*.

In step S150, as a result of the determining, if the commercial vehicle enters the second concentration area (S153, Yes), the server 300 determines that the second concentration area entered by the commercial vehicle is a congestion area (S155).

The server 300 may determine whether the congestion area occurs by monitoring a plurality of second concentration areas in real time or at a predetermined cycle. For example, the congestion area may be an area in which the number of commercial vehicles while operating in the second concentration area for a predetermined time is more than the number of calls. As an exemplary embodiment of the present disclosure, the congestion area may also be an area in which the number of commercial vehicles while operating in the second concentration area for the predetermined time is equal to or greater than the number of calls.

According to an exemplary embodiment of the present disclosure, the server 300 may determine the corresponding second concentration area as the congestion area when the number of commercial vehicles while operating in the second concentration area is more than the number of calls. For example, the server 300 may determine the second concentration area with in which the number of commercial vehicles is 70 and the number of calls is 64 as the congestion area (70 vehicles >64 calls).

According to another exemplary embodiment of the present disclosure, the server 300 may determine the corresponding second concentration area as the congestion area when the number of commercial vehicles while operating in the second concentration area is more than the number of calls by a predetermined size (e.g., 10 calls) or more. For example, the server 300 may determine that the second concentration area (70 vehicles <74 calls (64 calls+10 calls) in which the number of commercial vehicles is 70 and the number of calls is 64 is not the congestion area. As an exemplary embodiment of the present disclosure, the server 300 may determine that the second concentration area in which the number of commercial vehicles is 70 and the number of calls of the customer terminal 100_*i* is 59 is the congestion area (70 vehicles >69 calls (59 calls+10 calls). That is, the server 300 may determine an area where the number of commercial vehicles is significantly more than the number of calls of the customer terminal 100_*i* as the congestion area.

In step S150, as a result of the determining, in the case of the congestion area (S155, Yes), the server 300 sequentially transmits a second message of requesting the movement to the third concentration area to the vehicle terminal 200_*i* of a commercial vehicle corresponding to each grade in an order from a low grade to a high grade among the commercial vehicles while operating in the congestion area until the congestion area is released (S157).

The third concentration area may be a second concentration area close to the congestion area. Furthermore, the third concentration area may include a plurality of second concentration areas. For example, it is assumed that the second concentration areas are the second area B and the sixth area F, which are close to each other. Furthermore, it is assumed that after the commercial vehicle enters the sixth area F, the sixth area F was the congestion area. Accordingly, the third concentration area may be the second area B close to the sixth area F.

The second message may include information on the third concentration area.

For example, when the driver selects at least one third concentration area through the vehicle terminal 200_*i* to transmit an acceptance message to the server 300, the server 300 may transmit information on the third concentration area selected by the driver to the vehicle terminal 200_*i*. As an exemplary embodiment of the present disclosure, when the driver of the commercial vehicle transmits a rejection message of not selecting the third concentration area through the vehicle terminal 200_*i* to the server 300, the server 300 may select another commercial vehicle having a low grade and transmit a third request message to the vehicle terminal 200_*i* of the selected commercial vehicle.

For example, it is assumed that in the sixth area F which is the congestion area, a first commercial vehicle having a grade of 5 points, a second commercial vehicle having a grade of 6 points, and a third commercial vehicle having a grade of 8 points are operating. Then, until the sixth area F is released from the congestion area, the server 300 may transmit a second message of requesting the movement to the second area B sequentially to the vehicle terminal 200_*i* of each of the first commercial vehicle, the second commercial vehicle, and the third commercial vehicle. When the vehicle terminal 200_*i* of the first commercial vehicle transmits the rejection message to the server 300, the server 300 transmits the second message to the vehicle terminal 200_*i* of the second commercial vehicle. At the instant time, the vehicle terminal 200_*i* of the second commercial vehicle transmits the acceptance message to the server 300 and the second commercial vehicle may move to the second area B. Accordingly, the server 300 determines whether the congestion area is released again. When the sixth area F is released from the congestion area while the number of commercial vehicles which are operating in the sixth area F is smaller than the number of calls of the customer terminal 100_*i*, the server 300 may not transmit the second message to the vehicle terminal 200_*i* of the third commercial vehicle. If the sixth area F is not released from the congestion area, the server 300 may transmit the second message to the vehicle terminal 200_*i* of the third commercial vehicle having a higher grade than the grade of the second commercial vehicle.

As an exemplary embodiment of the present disclosure, the server 300 may classify a plurality of commercial vehicles which are operating in the congestion area into an upper group having a high grade, a middle group having a medium grade, and a lower group having a low grade. The server 300 may transmit the second message to the vehicle terminal 200_*i* of each of the plurality of commercial vehicles belonging to the lower group. Thereafter, if the congestion area is not released, the server 300 may transmit the second message to the vehicle terminal 200_*i* of each of the plurality of commercial vehicles belonging to the middle group. Thereafter, if the congestion area is not released, the server 300 may transmit the second message to the vehicle terminal 200_*i* of each of the plurality of commercial vehicles belonging to the upper group.

The server 300 may repetitively transmit the second message to the vehicle terminal 200_*i* of each commercial vehicle sequentially in an order from the commercial vehicle having a low grade to the commercial vehicle having a high grade until the congestion is released. That is, when the server 300 may monitor the second concentration area in real time and induce the commercial vehicle having a low grade to move to the third concentration area adjacent to the second concentration area when the commercial vehicles are concentrated in the second concentration area and then the congestion area occurs to solve the problem that the commercial vehicles are concentrated in any second concentration area.

In step S150, as a result of the determining, when the congestion area does not occur or the congestion area is released (S155, No), the server 300 allocates a call of the customer terminal 100_*i* to the commercial vehicle subscribing to the first call allocation service when a departure or destination of the call of the customer terminal 100_*i* is in the second concentration area (S159).

For example, when the departure of the call of the customer terminal 100_*i* is positioned in a predetermined second concentration area, the server 300 may check at least one commercial vehicle which is operating in the second concentration area and allocate the call of the customer terminal 100_*i* to the commercial vehicle positioned most adjacent to the departure of the call of the customer terminal 100_*i* among at least one or more commercial vehicles.

Next, as a result of the determining, when a specific call allocation service is not a first call allocation service (S140, No), the server 300 determines whether the specific call allocation service is a second call allocation service (S160).

Next, as a result of the determining, when the specific call allocation service is the second call allocation service (S160, Yes), the server 300 provides the second call allocation service to the vehicle terminal 200_*i*.

Referring to FIG. 7, in step S170, the server 300 extracts at least one or more first concentration areas matched with the operating time of the commercial vehicle, extracts a first preference area corresponding to the preference of the commercial vehicle among the extracted first concentration areas, and transmits a third request message of requesting the movement to the extracted first preference area to the vehicle terminal 200_*i* of the commercial vehicle (S171).

The third request message may include various information such as position information of the first preference area, information on a moving path to the first preference area from the current position of the commercial vehicle, an average call value of the first preference area, and the like.

The preference of the commercial vehicle may be derived by analysis for an area where a commercial vehicle is operating or analysis for an area where a driver of the commercial vehicle prefers. For example, the server 300 may determine the preference of the commercial vehicle by analyzing an operating pattern of the commercial vehicle. At the instant time, the commercial pattern may include a commercial time, the commercial number, and the like. Furthermore, the server 300 may receive information on an area selected by the driver of the commercial vehicle from the vehicle terminal 200_*i* and determine the preference of the commercial vehicle based on the received information.

The first preference area may be an area in which a time when the commercial vehicle operates for a predetermined time period with respect to a predetermined time period is a second reference value or more. At the instant time, the second reference value may be an average of a total operating time or a total operating number of the commercial vehicle in the plurality of first concentration areas for a predetermined time period with respect to a predetermined period. That is, the server 300 may extract a first concentration area in which the operating number or time of the commercial vehicle is an average value of more as the first preference area. Furthermore, the first preference area may be an area selected by the driver of the commercial vehicle among the plurality of first concentration areas. For example, the first preference area may include an area where a driver's residence is located, a first concentration area where the driver prefers according to a personal taste, and the like.

Referring to Table 1 above, the first concentration area matched with the commercial vehicle operating from 1 pm to 2 pm are a first area A, a second area B, a fourth area D, and a sixth area F. For example, the server 300 may extract the fourth area D and the sixth area F corresponding to the preference of the commercial vehicle as the first preference area from four first concentration areas. Even in a subsequent time, among the first concentration areas matched with the operating time for each time illustrated in Table 1, the server 300 may extract the first preference area corresponding to the preference of the commercial vehicle.

In step S170, the server 300 determines whether the commercial vehicle enters the first preference area (S173).

The server 300 may receive real-time position information of the commercial vehicle from the vehicle terminal 200_*i*. The server 300 may compare position information of the first preference area with real-time position information of the commercial vehicle to determine whether the commercial vehicle enters the first preference area.

In step S170, as a result of the determining, if the commercial vehicle does not enter the preference area (S173, No), the server 300 retransmits a third request message of requesting movement thereof to the first preference area to the vehicle terminal 200_*i* (S171).

For example, the server 300 may transmit navigation information in which a real-time position of the vehicle terminal 200_*i*, a remaining distance to the first preference area, a moving distance, and the like are indicated on a map to the vehicle terminal 200_*i*. As an exemplary embodiment of the present disclosure, the server 300 may transmit navigation information in which a remaining distance from the real-time position of the vehicle terminal 200_*i* to each of the plurality of first preference areas, a moving distance, and the like are indicated on a map to the vehicle terminal 200_*i*.

In step S170, as a result of the determining, if the commercial vehicle enters the preference area (S173, Yes), the server 300 retransmits a third request message of requesting movement thereof to the first preference area to the vehicle terminal 200_*i* (S175).

In step S170, as a result of the determining, in the case of the congestion area (S175, Yes), the server 300 sequentially transmits a fourth request message of requesting the movement to a second preference area close to the congestion area to the vehicle terminal 200_*i* of a commercial vehicle corresponding to each grade in an order from a low grade to a high grade among the commercial vehicles while operating in the congestion area until the congestion area is released (S177).

The fourth request message may include information on the second preference area. For example, when the driver selects at least one second preference area through the vehicle terminal 200_*i* to transmit an acceptance message to the server 300, the server 300 may transmit information on the second preference area selected by the driver to the vehicle terminal 200_*i*. As an exemplary embodiment of the present disclosure, when the driver of the commercial vehicle transmits a rejection message of not selecting the second preference area through the vehicle terminal 200_*i* to the server 300, the server 300 may select another commercial vehicle having a low grade and transmit a fourth request message to the vehicle terminal 200_*i* of the selected commercial vehicle. That is, in the same or similar method as or to step S157, the server 300 may induce the commercial vehicle to move to an area close to the congestion area according to a grade of the commercial vehicle.

The second preference area may be a first preference area adjacent to the congestion area. For example, referring to Table 1, it is assumed that the first preference areas are the second area B and the sixth area F, which are close to each other. Furthermore, it is assumed that after the commercial vehicle enters the sixth area F, the sixth area F was the congestion area. Accordingly, the second preference area may be the second area B close to the sixth area F.

For example, it is assumed that in the sixth area F which is the congestion area, a first commercial vehicle having a grade of 5 points, a second commercial vehicle having a grade of 6 points, and a third commercial vehicle having a grade of 8 points are operating. Then, until the sixth area F is released from the congestion area, the server 300 may transmit a fourth request message of requesting the movement to the second area B sequentially to the vehicle terminal 200_*i* of each of the first commercial vehicle, the second commercial vehicle, and the third commercial vehicle. When the vehicle terminal 200_*i* of the first commercial vehicle transmits the rejection message to the server 300, the server 300 transmits the fourth request message to the vehicle terminal 200_*i* of the second commercial vehicle. At the instant time, the vehicle terminal 200_*i* of the second commercial vehicle transmits the acceptance message to the server 300 and the second commercial vehicle may move to the second area B. Accordingly, the server 300 determines whether the congestion area is released again. When the sixth area F is released from the congestion area while the number of commercial vehicles which are operating in the sixth area F is smaller than the number of calls of the customer terminal 100_*i*, the server 300 may not transmit the fourth request message to the vehicle terminal 200_*i* of the third commercial vehicle. If the sixth area F is not released from the congestion area, the server 300 may transmit the fourth request message to the vehicle terminal 200_*i* of the third commercial vehicle including a higher grade than the grade of the second commercial vehicle.

As an exemplary embodiment of the present disclosure, the server 300 may classify a plurality of commercial vehicles which are operating in the congestion area into an upper group having a high grade, a middle group having a medium grade, and a lower group having a low grade. The server 300 may transmit the fourth request message to the vehicle terminal 200_*i* of each of the plurality of commercial vehicles belonging to the lower group. Thereafter, if the congestion area is not released, the server 300 may transmit the fourth request message to the vehicle terminal 200_*i* of each of the plurality of commercial vehicles belonging to the middle group. Thereafter, if the congestion area is not released, the server 300 may transmit the fourth request message to the vehicle terminal 200_*i* of each of the plurality of commercial vehicles belonging to the upper group.

The server 300 may repetitively transmit the fourth request message to the vehicle terminal 200_*i* of each commercial vehicle sequentially in an order from the commercial vehicle having a low grade to the commercial vehicle having a high grade until the congestion is released. That is, when the server 300 may monitor the first preference area in real time and induce the commercial vehicle having a low grade to move to the second preference area adjacent to the first preference area when the commercial vehicles are concentrated in the first preference area and then the congestion area occurs to solve the problem that the commercial vehicles are concentrated in any first preference area.

According to an exemplary embodiment of the present disclosure, when there is no second preference area close to the congestion area, the server 300 may transmit a fifth request message of requesting the movement to the first concentration area close to the congestion area to the vehicle terminal 200_*i*. That is, when there is the second preference area, the server 300 may induce the commercial vehicle operating in the congestion area to move to the second preference area. If there is no second preference area, the server 300 may induce the commercial vehicle operating in the congestion area to move to the first concentration area close to the congestion area. Accordingly, it is possible to solve a problem that the commercial vehicles are concentrated in the first preference area.

In step S170, as a result of the determining, when the congestion area does not occur or the congestion area is released (S175, No), the server 300 allocates a call of the customer terminal 100_*i* to a commercial vehicle subscribing to a second call allocation service when a departure or destination of the call of the customer terminal 100_*i* is in the first preference area (S179).

For example, when the departure of the call of the customer terminal 100_*i* is positioned in a predetermined first preference area, the server 300 may check at least one commercial vehicle which is operating in the first preference area and allocate the call of the customer terminal 100_*i* to the commercial vehicle positioned most adjacent to the departure of the call of the customer terminal 100_*i* among at least one or more commercial vehicles.

FIG. 8 is an exemplary diagram for describing occurrence of a congestion area among a plurality of first concentration areas. FIG. 9 is an exemplary diagram for describing a process of releasing the congesting area of FIG. 8.

Referring to FIG. 8, first concentration areas are a first area A, a second area B, a fourth area D, and a sixth area F. For example, the fourth area D and the sixth area F may be the second concentration areas in step S151. As an exemplary embodiment of the present disclosure, the fourth area D and the sixth area F may be the first preference areas in step S171. At the instant time, it is assumed that the commercial vehicle enters the sixth area F. Since the number (65) of commercial vehicles operating in the sixth area F is greater than the number (55) of calls occurring in the sixth area F, the server 300 mat determine the sixth area F as the congesting area.

For example, the server 300 may sequentially transmit a request message of requesting the movement to the fourth area D close to the sixth area F to the vehicle terminal 200_*i* of a commercial vehicle corresponding to each grade in an order from a low grade to a high grade among the commercial vehicles operating in the sixth area F. For example, in step S157, the fourth area D may be the third concentration area close to the congesting area. As an exemplary embodiment of the present disclosure, in step S177, the fourth area D may be the second preference area close to the congesting area.

As an exemplary embodiment of the present disclosure, when there is a large possibility that the fourth area D may be changed to the congestion area due to added commercial vehicles, the server 300 may transmit a request message of requesting the movement to the first area A and the second area B which are the first concentration areas close to the sixth area F to the vehicle terminal 200_*i* of the commercial vehicle. At this time, the server 300 may sequentially transmit a request message of requesting the movement to the first area A or the second area B to the vehicle terminal 200_*i* of a commercial vehicle corresponding to each grade in an order from a low grade to a high grade among the commercial vehicles operating in the sixth area F.

Referring to FIG. 9, the server 300 may transmit a request message to the vehicle terminal 200_*i* of each commercial vehicle so that five of the commercial vehicles which have been operating in the sixth area F move to the first area A and 10 commercial vehicles move to the second area B. Accordingly, because the number of commercial vehicles operating in each of the first area A, the second area B, the fourth area D, and the sixth area F is smaller than the number of calls, it is possible to prevent the problem that the congestion area occurs again.

Next, as a result of the determining, when a specified call allocation service is not a second call allocation service (S160, No), the server 300 provides a third call allocation service to the vehicle terminal 200_*i* (S180).

According to the third call allocation service, the server 300 may allocate the call of the customer terminal 100_*i* to the commercial vehicle located close to the departure of the call of the customer terminal 100_*i*.

Next, the server 300 determines whether there is an end request of the call allocation service from the vehicle terminal 200_*i* of the commercial vehicle (S190).

Next, as a result of the determining, when there is no end request of the call allocation service (S190, No), the server 300 may repeat from step S140. Next, as a result of the determining, when there is the end request of the call allocation service (S190, Yes), the server may end the call allocation service for the vehicle terminal 200_*i*.

Figure 10:
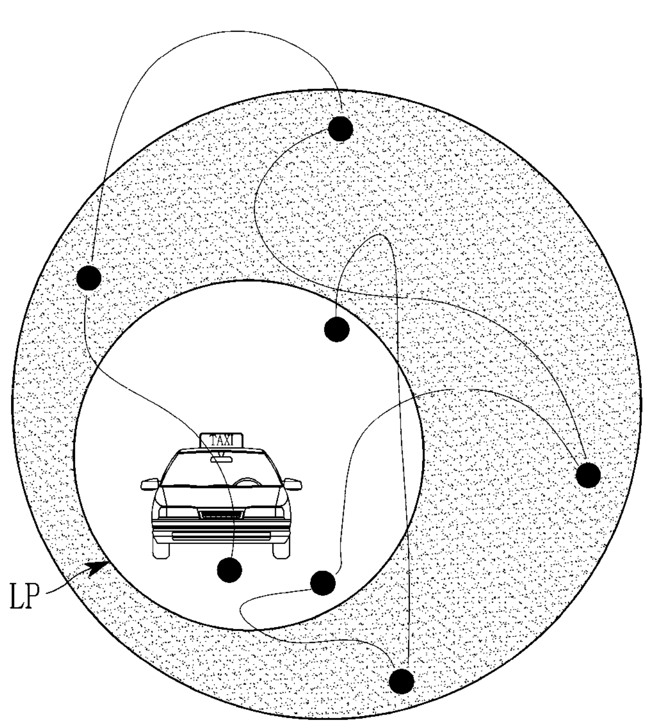
FIG. 10, and FIG. 11 are schematic views for comparing and describing a moving radius of a commercial vehicle according to a call allocation service in the related art and a moving radius of a commercial vehicle according to an exemplary embodiment of the present disclosure.
Figure 11:
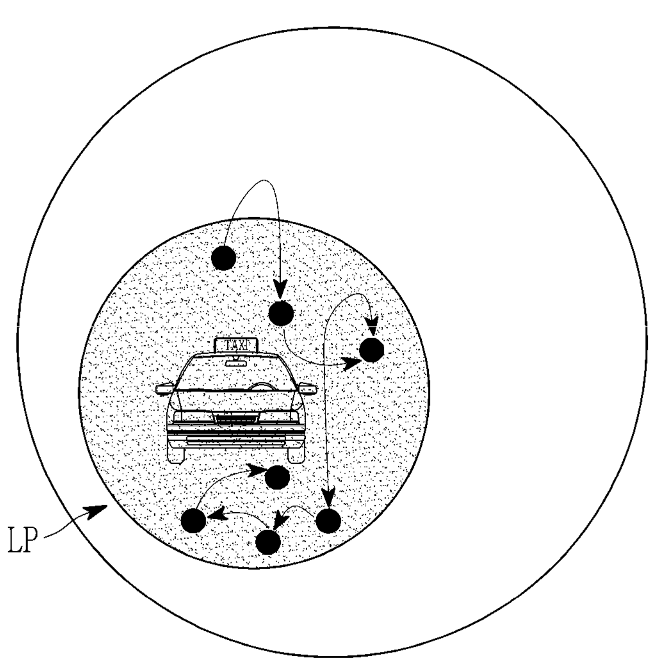

FIG. 10, and FIG. 11 are schematic views for comparing and describing a moving radius of a commercial vehicle according to a call allocation service in the related art and a moving radius of a commercial vehicle according to an exemplary embodiment of the present disclosure.

Referring to FIG. 10, in the case of commercial vehicles using a conventional call allocation service (the third call allocation service of the present disclosure), in many cases, a moving radius is very large. Furthermore, after the customer gets off, in many cases, the commercial vehicle wonders while there is no customer. Referring to FIG. 11, in the case of commercial vehicles using a call allocation service (the first call allocation service of the present disclosure) based on the concentration area of the present disclosure or a call allocation service (the second call allocation service of the present disclosure) based on the preference area of the present disclosure, since the departure or destination of the call of the customer terminal 100_*i* is located in a concentration area LP or preference area LP, the moving radius is small, and after the customer gets off, a probability to allocate the call again around here may be increased.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A call allocation system comprising:

as a system for allocating a call of a customer terminal to a commercial vehicle, a server which is configured to extract a plurality of first concentration areas matched with an operating time of the commercial vehicle among a plurality of concentration areas, to extract a second concentration area corresponding to a grade of the commercial vehicle among the plurality of first concentration areas, and to transmit a first message requesting movement thereof to the second concentration area to a vehicle terminal of the commercial vehicle, wherein the server is configured to allocate the call of the customer terminal, in which a departure or a destination is located in the second concentration area, to the commercial vehicle when the commercial vehicle enters the second concentration area, wherein the plurality of concentration areas are areas in which an average value of a number of calls per unit time corresponding to the operating time is more than a first reference value among a plurality of areas divided according to a predetermined reference, and wherein the grade is a score of evaluating satisfaction of the commercial vehicle, and a higher grade correlates with a higher number of calls occurring per unit time in the second concentration area, and wherein the first reference value is an average value of the number of calls occurring in the plurality of areas per unit time for a predetermined period, wherein the server is configured:

to determine whether a congestion area occurs by monitoring the second concentration area entered by the commercial vehicle, and as a result of the determining, when the congestion area occurs, to repeatedly transmit a second message to a vehicle terminal of each commercial vehicle sequentially in an order from a commercial vehicle having a low grade to a commercial vehicle having a high grade among commercial vehicles operating in the congestion area until the congestion area is released, wherein the second message includes information related to a plurality of third concentration areas located adjacent to the congestion area, wherein the congestion area is an area in which a number of the commercial vehicles during operating is more than the number of calls.

2. The call allocation system of claim 1, wherein the server is configured to extract a first concentration area in a first call group as the second concentration area for the commercial vehicle in a first grade group, wherein the first call group is a group corresponding to a largest average value, when the plurality of first concentration areas are classified into three call groups based on the average value, and wherein the first grade group is a group corresponding to a highest score range, when a score range of the grade is classified into three grade groups according to a predetermined reference.

3. The call allocation system of claim 2, wherein the server is configured to extract a first concentration area in a second call group as the second concentration area for the commercial vehicle in a second grade group, wherein the second call group is a group corresponding to an average medium value among the three call groups, and wherein the second grade group is a group corresponding to a medium score range among the three grade groups.

4. The call allocation system of claim 3, wherein the server is configured to extract a first concentration area in a third call group as the second concentration area for the commercial vehicle in a third grade group, wherein the third call group is a group corresponding to a smallest average value among the three call groups, and wherein the third grade group is a group corresponding to a lower score range among the three grade groups.

5. A call allocation system comprising:

as a system for allocating a call of a customer terminal to a commercial vehicle, a server which is configured to extract a plurality of first concentration areas matched with an operating time of the commercial vehicle among a plurality of concentration areas, to extract a first preference area corresponding to a grade of the commercial vehicle among the plurality of first concentration areas, and to transmit a first message requesting movement thereof to the first preference area to a vehicle terminal of the commercial vehicle, wherein the server is configured to allocate the call of the customer terminal, in which a departure or a destination is located in the first preference area, to the commercial vehicle when the commercial vehicle enters the first preference area, wherein the plurality of concentration areas are areas in which an average value of a number of calls per unit time corresponding to the operating time is more than a first reference value among a plurality of areas divided according to a predetermined reference, wherein preference of the commercial vehicle is determined by analysis for an area where the commercial vehicle is operating or analysis for an area where a driver of the commercial vehicle prefers, wherein the first preference area is an area where the operating time of the commercial vehicle is a second reference value or more than the second reference value or an area selected by the driver of the commercial vehicle among the plurality of first concentration areas, wherein the second reference value is an average of a total time operated by the commercial vehicle in the plurality of first concentration areas, and wherein the first reference value is an average value of the number of calls occurring in the plurality of areas per unit time for a predetermined period, wherein the server is configured:

to determine whether a congestion area occurs by monitoring the first preference area entered by the commercial vehicle, and as a result of the determining, when the congestion area occurs, to repeatedly transmit a second message to a vehicle terminal of each commercial vehicle sequentially in an order from a commercial vehicle having a low grade to a commercial vehicle having a high grade among commercial vehicles operating in the congestion area until the congestion area is released, wherein the second message includes information related to a plurality of second preference areas located adjacent to the congestion area, wherein the congestion area is an area in which a number of the commercial vehicles during operating is more than the number of calls, and wherein the grade is a score of evaluating satisfaction of the commercial vehicle.

6. A call allocation method comprising:

as a method for allocating a call of a customer terminal to a commercial vehicle subscribing to a call allocation service, extracting, by a server, a plurality of first concentration areas matched with an operating time of the commercial vehicle among a plurality of concentration areas, extracting, by the server, a second concentration area corresponding to a grade of the commercial vehicle among the plurality of first concentration areas, and transmitting, by the server, a first message requesting movement thereof to the second concentration area to a vehicle terminal of the commercial vehicle to guide the second concentration area; and providing, by the server, the call allocation service by allocating the call of the customer terminal, in which a departure or a destination is located in the second concentration area, to the commercial vehicle when the commercial vehicle enters the second concentration area, wherein a higher grade correlates with a higher number of calls occurring per unit time in the second concentration area, wherein the plurality of concentration areas are areas in which an average value of a number of calls per unit time corresponding to the operating time is than a first reference value among a plurality of areas divided according to a predetermined reference, wherein the first reference value is an average value of a number of calls occurring in the plurality of areas per unit time for a predetermined period, and wherein the grade is a score of evaluating satisfaction of the commercial vehicle, wherein the call allocation method further comprises:

before the providing of the call allocation service, determining, by the server, whether a congestion area occurs by monitoring the second concentration area entered by the commercial vehicle, and as a result of the determining, when the congestion area occurs, to repeatedly transmit a second message to a vehicle terminal of each commercial vehicle sequentially in an order from a commercial vehicle having a low grade to a commercial vehicle having a high grade among commercial vehicles operating in the congestion area until the congestion area is released to guide a third concentration area, wherein the second message includes information related to a plurality of third concentration areas located adjacent to the congestion area, and wherein the congestion area is an area in which a number of commercial vehicles during operating is more than a number of calls.

7. The call allocation method of claim 6, wherein the guiding of the second concentration area includes extracting a first concentration area in an upper call group as the second concentration area for a commercial vehicle in an upper grade group, wherein the upper call group is a group corresponding to a large average value when the plurality of first concentration areas are classified into three call groups based on the average value, and wherein the upper grade group is a group corresponding to a high score range, when a score range of the grade is classified into two grade groups according to a predetermined reference.

8. The call allocation method of claim 6, wherein the guiding of the second concentration area includes extracting a first concentration area in a lower call group as the second concentration area for a commercial vehicle in a lower grade group, wherein the lower call group is a group corresponding to a small average value of the two call groups, and wherein the lower grade group is a group corresponding to a low score range of the two grade groups.

9. A call allocation method comprising:

as a method for allocating a call of a customer terminal to a commercial vehicle subscribing to a call allocation service, extracting, by a server, at least one first concentration area matched with an operating time of the commercial vehicle among a plurality of concentration areas, extracting, by the server, a first preference area corresponding to preference of the commercial vehicle among the first concentration area, and transmitting, by the server, a first message requesting movement thereof to the first preference area to a vehicle terminal of the commercial vehicle to guide the first preference area; and providing, by the server, the call allocation service by allocating the call of the customer terminal, in which a departure or a destination is located in the first preference area, to the commercial vehicle when the commercial vehicle enters the first preference area, wherein the plurality of concentration areas are areas in which an average value of a number of calls per unit time corresponding to the operating time is more than a first reference value among a plurality of areas divided according to a predetermined reference, wherein the first reference value is an average value of the number of calls occurring in the plurality of areas per unit time for a predetermined period, wherein preference of the commercial vehicle is derived by analysis for an area where the commercial vehicle is operating or analysis for an area where a driver of the commercial vehicle prefers, wherein the first preference area is an area where the operating time of the commercial vehicle is a second reference value or more than the second reference value or an area selected by a driver of the commercial vehicle among the plurality of first concentration areas, and wherein the second reference value is an average of a total time operated by the commercial vehicle in the plurality of first concentration areas, wherein the call allocation method further comprises:

before the providing of the call allocation service, determining, by the server, whether a congestion area occurs by monitoring the first preference area entered by the commercial vehicle, and as a result of the determining, when the congestion area occurs, to repeatedly transmit a second message to a vehicle terminal of each commercial vehicle sequentially in an order from a commercial vehicle having a low grade to a commercial vehicle having a high grade among commercial vehicles operating in the congestion area until the congestion area is released to guide a second preference area, wherein the second message includes information related to a plurality of second preference areas located adjacent to the congestion area, and wherein the congestion area is an area in which a number of the commercial vehicles during operating is more than a number of calls.

* * * * *